US012451092B2

(12) United States Patent
Kim et al.

(10) Patent No.: US 12,451,092 B2
(45) Date of Patent: Oct. 21, 2025

(54) DISPLAY APPARATUS

(71) Applicant: LG Display Co., Ltd, Seoul (KR)

(72) Inventors: Nak-Yoon Kim, Gyeonggi-do (KR); Jong-Taek Kim, Gyeonggi-do (KR); Ji-Yong Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/535,707

(22) Filed: Dec. 11, 2023

(65) Prior Publication Data

US 2024/0221700 A1 Jul. 4, 2024

(30) Foreign Application Priority Data

Dec. 29, 2022 (KR) ........................ 10-2022-0189147

(51) Int. Cl.
*G09G 3/36* (2006.01)
*G09G 3/20* (2006.01)

(52) U.S. Cl.
CPC ......... *G09G 3/3618* (2013.01); *G09G 3/2037* (2013.01); *G09G 2300/0876* (2013.01); *G09G 2330/021* (2013.01); *G09G 2360/12* (2013.01)

(58) Field of Classification Search
CPC ......................... G09G 3/3618; G09G 2360/12
See application file for complete search history.

(56) References Cited

U.S. PATENT DOCUMENTS

2022/0059033 A1* 2/2022 Seki ..................... G09G 3/3233

* cited by examiner

*Primary Examiner* — Kevin M Nguyen
(74) *Attorney, Agent, or Firm* — Fish & Richardson P.C.

(57) ABSTRACT

A display apparatus includes a display panel including pixels arranged along a plurality of horizontal lines; a data driving portion converting image data of the pixels into data voltages; a frame memory receiving and storing the image data of a refresh frame; and a data processing portion receiving and image quality-processing the image data stored in the frame memory in a unit of one horizontal line, and transmitting the image quality-processed image data to the data driving portion and the frame memory; wherein the frame memory updates and stores the image quality-processed horizontal line image data into a corresponding horizontal line therein, and wherein image data of a $n^{th}$ refresh frame updated in the frame memory are transmitted to the data driving portion in a unit of one horizontal line when an image of a $n+1^{th}$ refresh frame is identical to an image of the $n^{th}$ refresh frame.

16 Claims, 6 Drawing Sheets

DISPLAY APPARATUS

CROSS-REFERENCE TO RELATED APPLICATIONS

The present application claims the priority benefit of Korean Patent Application No. 10-2022-0189147 filed in Republic of Korea on Dec. 29, 2022, which is hereby incorporated by reference in its entirety for all purposes as if fully set forth herein.

TECHNICAL FIELD

The present disclosure relates to a display apparatus.

BACKGROUND

As an information society develops, demands for display apparatuses for displaying images have increased in various forms, and in recent years, various flat display apparatuses such as organic light emitting display apparatuses and liquid crystal display apparatuses have been used.

The organic light emitting display apparatus is widely used because it has advantages of miniaturization, light weight, thinness, and low power driving.

In general, in the organic light emitting display apparatus, an image displayed on a display panel is refreshed every frame.

Accordingly, even when the same still image is displayed, refresh operation is continuously performed for each frame, so that considerable power is consumed.

SUMMARY

An advantage of the present disclosure is to provide a display apparatus that may reduce power consumption.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display apparatus includes a display panel in which pixels are arranged along a plurality of horizontal lines: a data driving portion which converts image data of the pixels into data voltages and outputs the data voltages to the display panel: a frame memory which receives and stores the image data of a refresh frame from a host: and a data processing portion which receives and image quality-processes the image data stored in the frame memory in a unit of one horizontal line, and transmits the image quality-processed image data to the data driving portion and the frame memory: wherein the frame memory updates and stores the image data of the horizontal line image quality-processed into a corresponding horizontal line therein, and wherein image data of a $n^{th}$ refresh frame updated in the frame memory are transmitted to the data driving portion in a unit of one horizontal line when an image of a $n+1^{th}$ refresh frame is identical to an image of the $n^{th}$ refresh frame.

In another aspect, a display apparatus includes a display panel in which pixels are arranged along a plurality of horizontal lines: a data driving portion which converts image data of the pixels into data voltages and outputs the data voltages to the display panel: a frame memory which receives and stores the image data of a refresh frame: and a data processing portion which image quality-processes the image data stored in the frame memory and transmits the image quality-processed image data to the data driving portion and the frame memory, wherein the frame memory updates and stores the image quality-processed image data, and wherein when an image of a current refresh frame is identical to an image of a previous refresh frame, image data of the previous refresh frame updated in the frame memory is transmitted to the data driving portion.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 11

DETAILED DESCRIPTION

Figure 1:
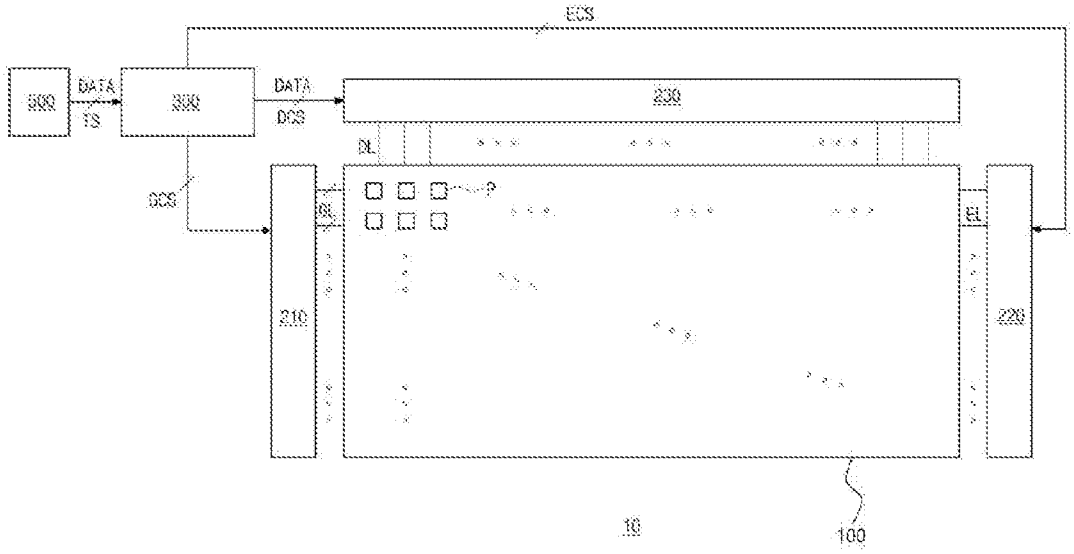
FIG. 1 is a view schematically illustrating a display apparatus according to an aspect of the present disclosure.

Advantages and features of the present disclosure and methods of achieving them will be apparent with reference to the embodiments described below in detail with the accompanying drawings. However, the present disclosure is not limited to the embodiments disclosed below, but may be realized in a variety of different forms, and only these embodiments allow the present disclosure to be complete. The present disclosure is provided to fully inform the scope of the disclosure to the skilled in the art of the present disclosure, and the present disclosure may be defined by the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof may be omitted. When 'comprising', 'including', 'having', 'consisting', and the like are used in this disclosure, other parts may be added unless 'only' is used. When a component is expressed in the singular, cases including the plural are included unless specific statement is described.

In interpreting the components, even if there is no separate explicit description, it is interpreted as including a margin range.

In the case of a description of a connection relationship, for example, when a connection relationship is described as 'connected', etc., one or more other parts may be connected between two parts unless 'direct' or 'direct' is used.

In the case of a description of a positional relationship, for example, when the positional relationship of two parts is described as 'on', 'over', 'above', 'below', 'beside', 'under', and the like, one or more other parts may be positioned between such two parts unless 'right' or 'directly' is used.

In the case of a description of a temporal relationship, for example, when a temporal precedence is described as 'after', 'following', 'before', and the like, cases that are not continuous may be included unless 'directly' or 'immediately' is used.

In describing components of the present disclosure, terms such as first, second, and the like may be used. These terms are only for distinguishing the components from other components, and an essence, order, order, or number of the components is not limited by the terms.

Respective features of various embodiments of the present disclosure may be partially or wholly connected to or combined with each other and may be technically interlocked and driven variously, and respective embodiments may be independently implemented from each other or may be implemented together with a related relationship.

Hereinafter, embodiments of the present disclosure are described with reference to accompanying drawings. In the following embodiments, the same or similar reference numerals may be assigned to the same or similar components, and detailed descriptions thereof may be omitted.

Figure 2:
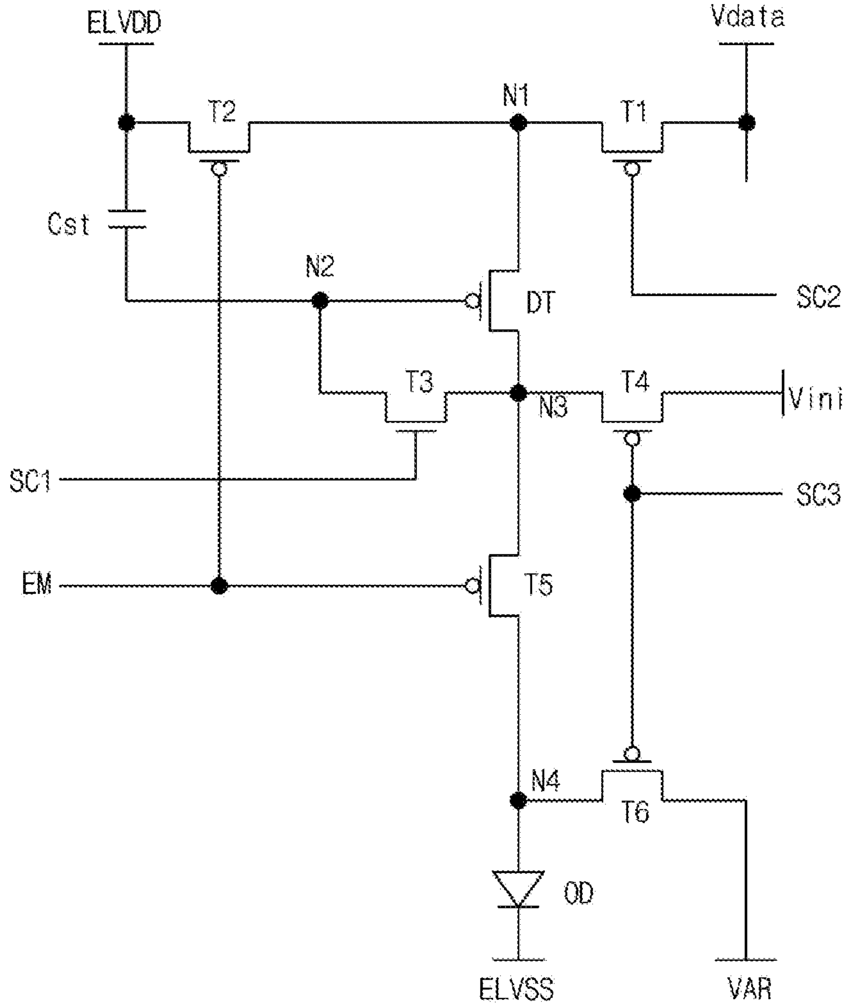
FIG. 2 is a circuit diagram schematically illustrating an example of a pixel according to an aspect of the present disclosure.
Figure 3:
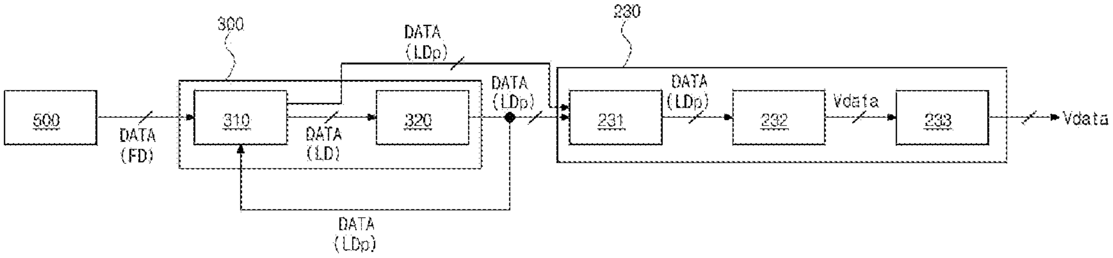
FIG. 3 is a block diagram schematically illustrating the configuration of a timing controlling portion and a data driving portion of a display apparatus according to an aspect of the present disclosure.

FIG. 1 is a view schematically illustrating a display apparatus according to an aspect of the present disclosure. FIG. 2 is a circuit diagram schematically illustrating an example of a pixel according to an aspect of the present disclosure. FIG. 3 is a block diagram schematically illustrating the configuration of a timing controlling portion and a data driving portion of a display apparatus according to an aspect of the present disclosure.

Prior to a detailed description, the display apparatus 10 according to the present disclosure may include any one of all types of display apparatuses to which configurations related to power consumption reduction (or low power driving) described later may be applied, including an organic light emitting display apparatus and a liquid crystal display apparatus. Meanwhile, for convenience of explanation, in this aspect, as the display apparatus 10, an organic light emitting display apparatus is described as an example.

Referring to FIGS. 1 to 3, the display apparatus 10 of this aspect may include a display panel 100 and a driving circuit portion that drives the display panel 100.

Here, the driving circuit portion may include, for example, a gate driving portion 210, an emission driving portion 220, a data driving portion 230, and a timing controlling portion 300.

Regarding the display panel 100, pixels P may be arranged in a matrix form along a plurality of horizontal lines (or row lines) and a plurality of vertical lines (or column lines) on a substrate of the display panel 100.

An image may be displayed on the display panel 100 through light output from the plurality of pixels P.

Here, the plurality of pixels P may include pixels displaying different colors, for example, red, green, and blue pixels respectively displaying red, green, and blue, but are not limited thereto.

In the display panel 100, various signal lines that transmit driving signals for driving the pixels P may be formed on the substrate.

In this regard, for example, a plurality of data lines DL that transmit data signals (or data voltages) as image signals may extend along the vertical direction and be connected to the pixels P of the corresponding vertical lines. In addition, a plurality of gate lines GL that transmit gate signals (or gate voltages) may extend in the horizontal direction and be connected to the pixels P of the corresponding horizontal lines. In addition, a plurality of emission lines (or a plurality of emission control lines) EL that transmit emission control signals (or emission control voltages) may extend in the horizontal direction and be connected to the pixels P of the corresponding horizontal lines.

In addition to the data line DL, the gate line GL, and the emission line EL, other signal lines may be provided.

As such, the pixels P may be defined by the data lines DL, gate lines GL, and emission lines EL that cross each other.

Each pixel P may include a light emitting diode OD as a light emitting element, and a plurality of transistors and at least one capacitor for driving the light emitting diode OD.

Meanwhile, in this aspect, for convenience of explanation, as shown in FIG. 2, a 7T1C structure including seven transistors T1 to T6 and DT and one capacitor Cst in the pixel P is taken as an example.

Referring to FIG. 2, the pixel P may include the first to sixth transistors T1 to T6 which are switching transistors, the driving transistor DT, the storage capacitor Cst, and the light emitting diode OD.

Meanwhile, in FIG. 2, a case in which the first, second, fourth, fifth, and sixth transistors T1, T2, T4, T5, and T6 are formed of P-type transistors, and the third transistor T3 is formed of an N-type transistor, and the transistor DT is formed of a P-type transistor is described as an example, but is not limited thereto.

The first to sixth transistors T1 to T6 and the driving transistor DT may include semiconductors of the same material or semiconductors of different materials. In this regard, for example, at least some of the first to sixth transistors T1 to T6 and the driving transistor DT may include one of a crystalline silicon layer, an oxide semiconductor layer, and an amorphous semiconductor layer.

Meanwhile, the oxide semiconductor may have characteristics suitable for a switching transistor due to excellent off-current characteristics, so that at least one of the first to sixth transistors T1 to T6 may include the oxide semiconductor layer. The crystalline silicon has excellent mobility, so that the driving transistor DT may include the crystalline silicon layer.

The gate signals provided to an $n^{th}$ horizontal line of FIG. 2 may be provided from the corresponding $n^{th}$ stage of the gate driving portion 210, and for example, three gate signals may be provided from the stage. For convenience of explanation, the three gate signals may be first, second and third gate signals SC1, SC2 and SC3. In this case, on the $n^{th}$ horizontal line, three gate lines GL for transmitting the three gate signals may be disposed.

A gate of the first transistor T1 may receive the second gate signal SC2. A source of the first transistor T1 may receive the data voltage Vdata transmitted through the corresponding data line DL. A drain of the first transistor T1 may be connected to a source of the driving transistor DT at a first node N1. The first transistor T1 may be turned on by the second gate signal SC2 to supply the data voltage Vdata to the source of the driving transistor DT.

A gate of the second transistor T2 may receive the emission control signal EM of the corresponding horizontal line. A source of the second transistor T2 may receive a high potential driving voltage ELVDD. A drain of the second transistor T2 may be connected to the first node N1. The second transistor T2 may be turned on by the emission control signal EM to supply the high potential driving voltage ELVDD to the source of the driving transistor DT.

A gate of the third transistor T3 may receive the first gate signal SC1. A source of the third transistor T3 may be connected to a drain of the driving transistor DT at a third node N3. A drain of the third transistor T3 may be connected to the gate of the driving transistor DT at a second node N2. The third transistor T3 may be turned on by the first gate signal SC1 so that a threshold voltage of the driving transistor DT may be sampled.

A gate of the fourth transistor T4 may receive the third gate signal SC3. A source of the fourth transistor T4 may receive an initialization voltage Vini. A drain of the fourth transistor T4 may be connected to the third node N3. The fourth transistor T4 may be turned on by the third gate signal SC3 to supply the initialization voltage Vini to the drain of the driving transistor DT.

A gate of the fifth transistor T5 may receive the emission control signal EM. A source of the fifth transistor T5 may be connected to the third node N3. The drain of the fifth transistor T5 may be connected to an anode of the light emitting diode OD at a fourth node N4. The fifth transistor T5 may be turned on by the emission control signal EM to provide a driving current (or emission current) to the anode of the light emitting diode OD.

A gate of the sixth transistor T6 may receive the third gate signal SC3. As another example, the gate of the sixth transistor T6 may receive a third gate signal of the next horizontal line. A source of the sixth transistor T6 may receive an anode reset voltage VAR. A drain of the sixth transistor T6 may be connected to the anode of the light emitting diode OD at a fourth node N4. The sixth transistor T6 may be turned on by the third gate signal SC3 to supply the anode reset voltage VAR to the anode of the light emitting diode OD.

The gate of the driving transistor DT may be connected to the drain of the third transistor T3 at the second node N2. The drain of the driving transistor DT may be connected to the source of the third transistor T3 and the source of the fifth transistor T5 at the third node N3. The source of the driving transistor DT may be connected to the drain of the first transistor T1 and the drain of the second transistor T2 at the first node N1. The driving transistor DT may be turned on according to the data voltage Vdata to allow the driving current to flow to the light emitting diode OD.

A first electrode of the storage capacitor Cst may receive the high potential driving voltage ELVDD. A second electrode of the storage capacitor Cst may be connected to the gate of the driving transistor DT at the second node N2. The storage capacitor Cst may store a gate voltage of the driving transistor DT.

The anode of the light emitting diode OD may be connected to the drain of the fifth transistor T5 and the drain of the sixth transistor T6 at the fourth node N4. A cathode of the light emitting diode OD may receive a low potential driving voltage ELVSS. The light emitting diode OD may receive the driving current provided through the driving transistor DT and emit light with a luminance corresponding to the driving current.

The above-described 7T1C structure of the pixel P is an example, and the pixel P of this aspect may be configured with other structures.

Referring back to FIG. 1, the gate driving portion 210 may receive a gate driving control signal GCS from the timing controlling portion 300 to generate the gate signals SC, and may sequentially apply the gate signals SC to the gate lines GL. For example, the gate signals SC may be sequentially output in a vertical direction from top to bottom on the drawing.

Although not specifically shown, the gate driving portion 210 may include at least one gate IC. In this case, the gate IC of the gate driving portion 210 may be connected to a non-display region on one side of the display panel 100 while the gate IC being mounted on a flexible circuit film, or may be directly mounted on the non-display region.

As another example, the gate driving portion 210 may be formed directly on the substrate of the display panel 100 in a type of a gate-in panel (GIP). For example, the gate driving portion 210 may be formed in processes of forming elements of the display panel 100.

The emission driving portion 220 may receive an emission driving control signal ECS from the timing controlling portion 300 to generate the emission control signals EM, and may sequentially apply the emission control signals EM to the emission lines EL. For example, the emission control signals EM may be sequentially output in the vertical direction from the top to the bottom on the drawing.

Although not specifically shown, the emission driving portion 220 may include at least one emission IC. In this case, the emission IC of the emission driving portion 220 may be connected to the non-display region on one side of the display panel 100 while the emission IC being mounted on a flexible circuit film, or may be directly mounted on the non-display region.

As another example, the emission driving portion 220 may be formed directly on the substrate of the display panel 100 in a type of a gate-in panel (GIP). For example, the emission driving portion 220 may be formed in processes of forming elements of the display panel 100.

The data driving portion 230 may receive the image data DATA and a data driving control signal DCS from the timing controlling portion 300, and may convert the image data DATA into the data voltages Vdata, which are analog image data, in response to the data driving control signal DCS and then output the data voltages Vdata to the corresponding data lines DL in a unit of one horizontal line.

Although not specifically shown, the data driving portion 230 may include at least one data IC. In this case, the data IC of the data driving portion 230 may be connected to the non-display region on the corresponding one side of the display panel 100 while the data IC being mounted on a flexible circuit film, or may be directly mounted on the non-display region.

Meanwhile, at least two of the gate driving portion 210, the emission driving portion 220, and the data driving portion 230 may be integrated. For example, the gate driving portion 210 and the emission driving portion 220 may be configured in a form of an integrated circuit.

The timing controlling portion 300 may receive the image data DATA and a timing signal TS from a host 500, and may use the timing signal TS to generate the data driving control signal DCS, the gate driving control signal GCS and the emission driving control signal ECS and output the data driving control signal DCS, the gate driving control signal GCS and the emission driving control signal ECS to the data driving portion 230, the gate driving portion 210 and the emission driving portion 220, respectively. Here, the timing signal TS may include, for example, a vertical synchronization signal, a horizontal synchronization signal, a data enable signal, a clock signal and the like.

The timing controlling portion 300 and the data driving portion 230 are be described in more detail with reference to FIG. 3.

The timing control portion 300 may include a frame memory 310 and a data processing portion (or image processing portion or image quality improvement portion) 320. The data driving portion 230 may include a latch 231, a digital-to-analog converter (DAC) 232, and a buffer 233.

The frame memory 310 of the timing controlling portion 300 may, for example, store image data DATA by one frame i.e., frame image data FD transmitted from the host 500 through a main link. In this regard, for example, the host 500 may transmit the frame image data FD to the timing controlling portion 300 through the main link in a vertical back porch (VBP) section, and the timing controlling portion 300 may store the input frame image data FD in the frame memory 310.

The data processing portion 320 may, for example, receive the image data DATA in a unit of one horizontal line i.e., horizontal line image data LD from the frame memory 310 during an active section, and may perform processing to improve image quality on each input horizontal line image data LD. The image quality-processed horizontal line image data LDp may be transmitted to the data driving portion 230.

Meanwhile, the data processing portion 320 may transmit the image quality-processed horizontal line image data LDp to the frame memory 310. The horizontal line image data LDp transmitted in this way may be updated to the corresponding horizontal line in the frame memory 310. Meanwhile, when there is no image change in a current frame image compared to a previous frame image, the updated horizontal line image data LDp in the frame memory 310 may be directly transmitted to the latch 231 of the data driving portion 230 without passing through the data processing portion 320.

In this way, since the horizontal line image data LDp image quality-processed in the data processing portion 320 is transmitted to the frame memory 310 and updated, when there is no image change in the current frame image compared to the previous frame image, the image quality processing operation of the data processing portion 320 may be omitted. Thus, low power driving capable of reducing power consumption for image quality processing is possible, which is described in more detail below.

The latch 231 of the data driving portion 230 may temporarily store the horizontal line image data LDp transmitted from the timing controlling portion 300.

The DAC 232 of the data driving portion 230 may receive the horizontal line image data LDp from the latch 231 in the corresponding horizontal period, and then generate and output the corresponding data voltages Vdata using gamma voltages.

The buffer 233 of the data driving portion 230 may buffer the data voltages Vdata and output them to the corresponding data lines DL.

As such, the data voltage Vdata output to the data line DL may be input to the corresponding pixel P, and the pixel P may be refreshed by the input data voltage Vdata.

Meanwhile, the display apparatus 10 of this aspect configured as described above may be driven with low power in a variable refresh rate (VRR) method in which a refresh cycle (or rate) is varied to reduce power consumption.

Figure 4:
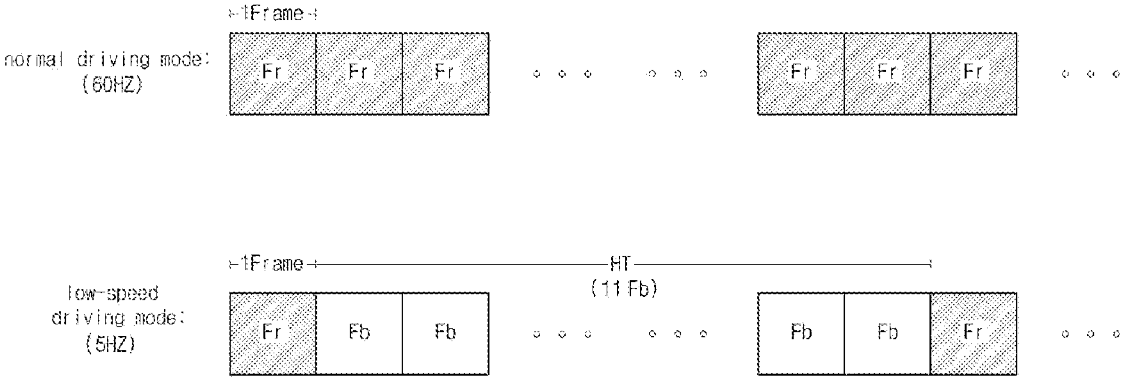
FIG. 4 is a view schematically illustrating a normal driving mode and a low-speed driving mode of a VRR method of a display apparatus according to an aspect of the present disclosure.

Such the VRR driving is described with reference to FIG. 4 as an example.

For example, in a normal driving mode, the display apparatus 10 may operate to refresh (or update) an image of the display panel 100 (or the data voltage Vdata applied to each pixel P) every frame. For example, the display apparatus 10 is driven at a refresh rate of 60 Hz in the normal driving mode, and a refresh operation is performed at each of 60 frames per second. That is, all frames may be allocated as refresh frames (or active frames) Fr.

In a case of displaying a still image, the display apparatus 10 may be driven in a low-speed driving mode. In the low-speed driving mode, the refresh rate is reduced so that the refresh cycle of the display panel 100 becomes longer. For example, in the case of low-speed driving at a refresh rate of 5 Hz as shown in FIG. 4, one refresh frame Fr and a holding time HT consisting of 11 consecutive blank frames (or non-refresh frames or non-active frames or skip frame) Fb may be alternately repeated. Here, the refresh operation is not performed in the blank frame Fb.

As such, in the low-speed driving mode, the cycle of the refresh frames Fr (or the interval between the refresh frames Fr) becomes longer, and the holding time HT consisting of at least one blank frame Fb in which the refresh operation is stopped exists between the refresh frames Fr.

During the holding time HT, the operation of the driving circuit portion for image refresh and the display panel 100 is substantially stopped, so that power consumption may be significantly reduced.

In this regard, for example, in performing the refresh operation of the refresh frame Fr, analog power of the display apparatus 10 may consume approximately 229.1 mW and digital power of the display apparatus 10 may consume approximately 97.9 mW. On the other hand, in performing the refresh stop operation of the blank frame Fb, analog power of the display apparatus 10 may consume approximately 60.8 mW and digital power of the display apparatus 10 may consume approximately 8.2 mW.

As such, compared to the refresh frame Fr, analog power consumption in the blank frame Fb is reduced to approximately 26. 5%, and digital power consumption in the blank frame Fb is reduced to approximately 8. 4%. As such, when the low-speed driving mode is performed by applying the VRR method, power consumption may be significantly reduced.

Meanwhile, in the blank frame Fb, a reset operation for the anode of the light emitting diode OD in the pixel P of the display panel 100 may be performed. In this regard, when the refresh operation for the pixel P is stopped, a voltage at the anode of the light emitting diode OD rises, so that a luminance rises, which may be recognized as a bright spot.

To prevent this, the anode of the light emitting diode OD may be reset even in the blank frame Fb. In this regard, for example, in the blank frame Fb, the sixth transistor T6 is turned on to provide the anode reset voltage VAR to the anode of the light emitting diode OD to reset it. Accordingly, variation of the anode voltage in the blank frame Fb may be reduced.

Further, in driving in the VRR method, when there is no change in the image of the refresh frame Fr in the low-speed driving mode, data transmission from the host 500 to the timing controlling portion 300 may be turned off.

In this regard, the host 500 may check whether an image is changed, that is, whether or not it is updated, and if there is an update of the image, the host 500 may transmit and store new frame image data FD to the frame memory 310 of the timing controlling portion 300 through the main link. In contrast, when there is no image update, the main link between the host 500 and the timing controlling portion 300 is in off state, and data transmission may be stopped. As such, when there is no image update, by performing a refresh operation using the image data stored in the frame memory 310 during the corresponding refresh frame Fr, the display panel 100 may be refreshed with the same image.

In this regard, as described above, the display apparatus 10 of this aspect may update the image data LDp image quality-processed through the data processing portion 320 in the frame memory 310 in the refresh frame Fr. Accordingly, when the same frame image data FD is input thereafter, the image quality processing operation may be omitted and power consumption may be reduced. This is described in detail.

FIGS. 5 to 9 are views schematically illustrating an example of a low-power driving process of a display apparatus according to an aspect of the present disclosure.

Figure 5:
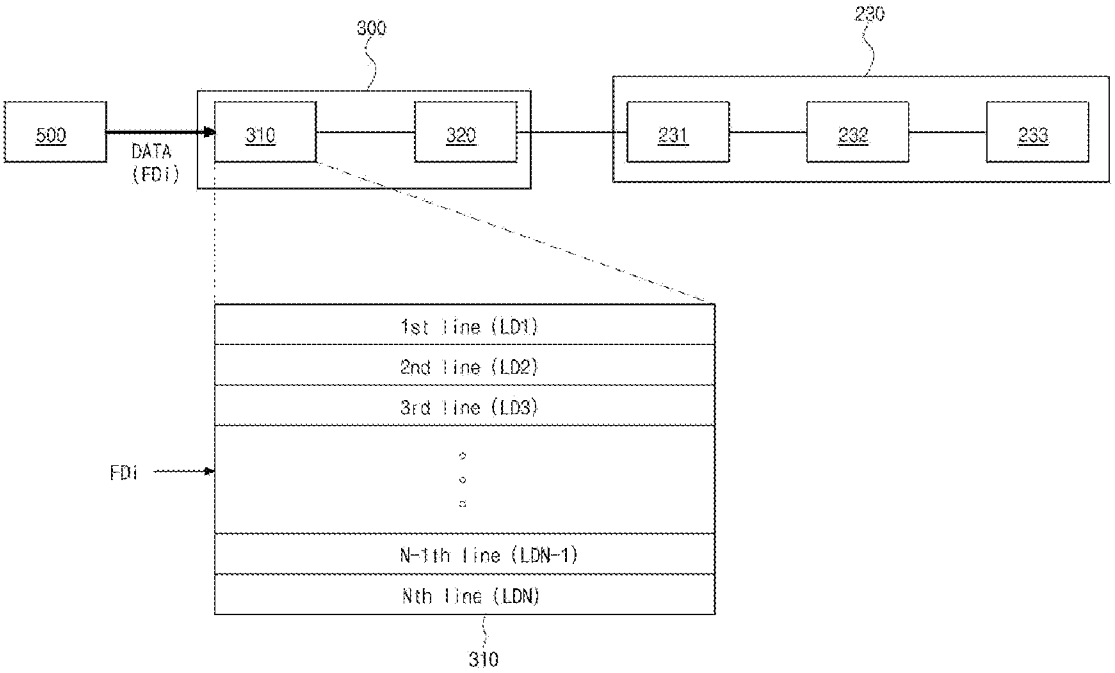
FIGS. 5 to 9 are views schematically illustrating an example of a low-power driving process of a display apparatus according to an aspect of the present disclosure.

Referring to FIG. 5, in a vertical back porch section of an $i^{th}$ frame, which is a refresh frame, image data (DATA, FDi) of an $i^{th}$ frame may be transmitted from the host 500 to the frame memory 310 of the timing controlling portion 300 and be stored.

In this regard, for example, in a case of the display panel 100 having a plurality of horizontal lines, for example, first to $N^{th}$ horizontal lines, the frame memory 310 may include first to $N^{th}$ horizontal lines corresponding to the first to $N^{th}$ horizontal lines of the display panel 100, respectively. In the drawings, the first to $N^{th}$ horizontal lines of the frame memory 310 are written as the first to $N^{th}$ lines. Accordingly, the frame image data FDi may be stored in the frame memory 310 in a unit of one horizontal line. That is, in the first to $N^{th}$ horizontal lines, the respective horizontal line image data LD1 to LDN may be stored.

Figure 6:
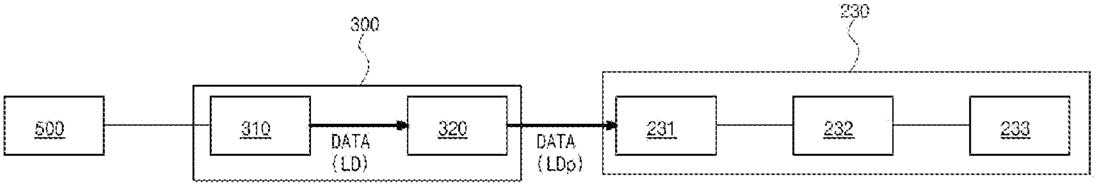

Next, referring to FIG. 6, during an active section in the refresh frame, image data LD may be sequentially transmitted to the data processing portion 320 in a unit of one horizontal line from the frame memory 310.

Accordingly, the data processing portion 320 may perform image quality processing of the input horizontal line image data LD during the corresponding horizontal period. The image quality processing in the data processing portion 320 may be sequentially performed on the first to $N^{th}$ horizontal lines of the frame image data FDi.

The horizontal line image data LDp image quality-processed by the data processing portion 320 may be transmitted to the latch 231 of the data driving portion 230 in a unit of one horizontal line.

Regarding the image quality processing in a unit of one horizontal line of the data processing portion 320, for example, for the $n^{th}$ horizontal line image data LD, the data processing portion 320 may receive this image data LD and image quality-process it, and then may output the image quality-processed $n^{th}$ horizontal line image data LDp to the latch 231. Thereafter, the data processing portion 320 may image quality-process the image data LD of the $n+1^{th}$ horizontal line, which is the next horizontal line, and output it to the latch 231.

Meanwhile, the data processing portion 320 may also output the horizontal line image data LDp output to the latch 231 to the frame memory 310, and the frame memory 310 may update the corresponding horizontal line therein with the image quality-processed horizontal line image data LDp.

Figure 7:
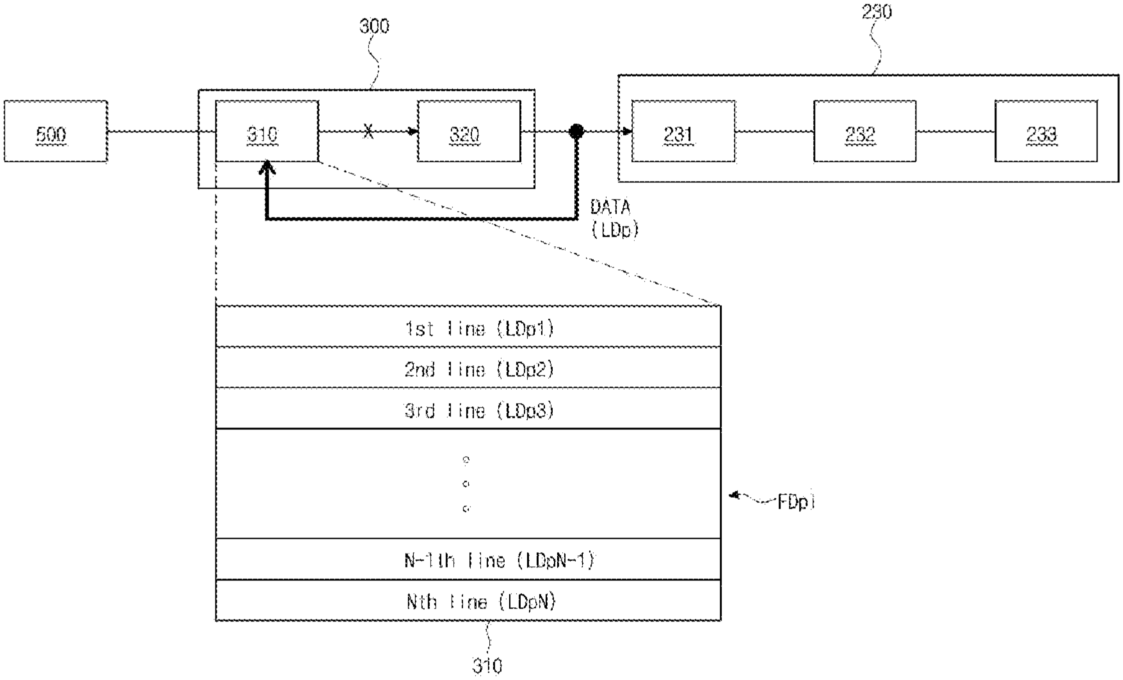

In this regard, referring to FIG. 7, the data processing portion 320 may transmit the image quality-processed horizontal line image data LDp to the frame memory 310 after transmitting it to the latch 231 (or at the same time as transmitting it to the latch 231).

For example, when the transmission of the horizontal line image data LD from the frame memory 310 to the data processing portion 320 is completed, the frame memory 310 may be switched to a standby state and the connection between the data processing portion 320 and the frame memory 310 may become in an off state. In the off state, the data processing portion 320 may transmit the image quality-processed horizontal line image data LDp to the frame memory 310, and the corresponding horizontal line of the frame memory 310 may be updated with the image quality-processed horizontal line image data LDp.

After updating the horizontal line image data LDp, the standby state of the frame memory 310 may be released. Thus, the connection between the data processing portion 320 and the frame memory 310 may be switched to an on state, and the image data LD of the next horizontal line may be transmitted from the frame memory 310 to the data processing portion 320 for the image quality processing.

When the above-described update process in a unit of one horizontal line is performed for each of all horizontal lines of the frame, as shown in FIG. 7, the frame memory 310 may be updated with first to $N^{th}$ horizontal line image data LDp1 to LDpN subjected to image quality processing. Accordingly, the $i^{th}$ frame image data FDpi image quality-processed may be updated and stored in the frame memory 310.

Figure 8:
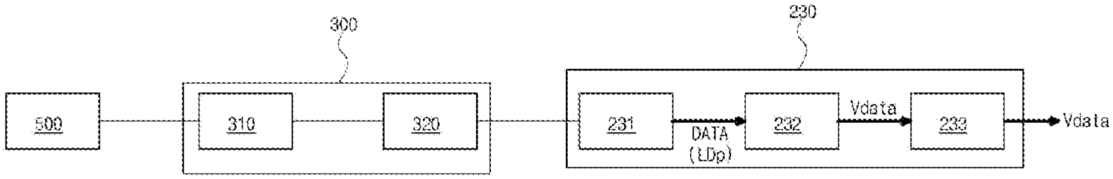

Meanwhile, as shown in FIG. 8, the horizontal line image data LDp transmitted and stored into the latch 231 may be transmitted to the DAC 232, and then be converted into the data voltages Vdata corresponding to gray levels of the respective image data DATA using gamma voltages.

The data voltage Vdata generated by the DAC 232 may pass through the buffer 233 and be output to the corresponding data line DL. The data voltage Vdata output to the data line DL may be input to the corresponding pixel P of the corresponding horizontal line. The pixel P may be refreshed by the input data voltage Vdata.

The above processes may be performed whenever a frame image is input from the host 500 to the timing controlling portion 300, so that an image of the display panel 100 may be refreshed.

Figure 9:
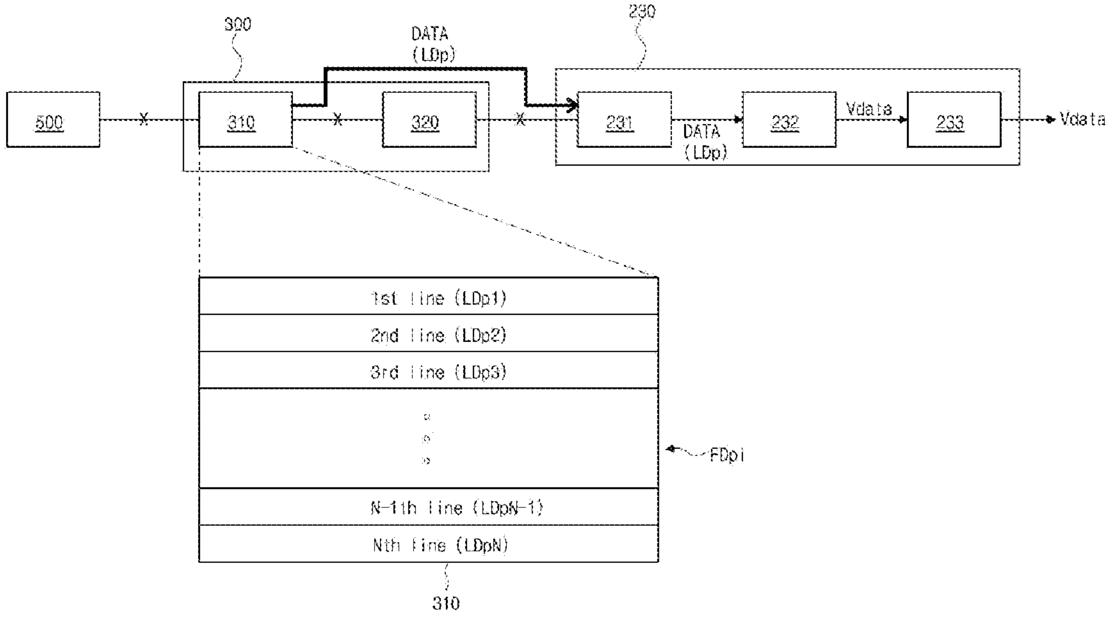

Meanwhile, when an image of the current refresh frame is the same as an image of the previous refresh frame without change, a low-power operation as shown in FIG. 9 may be performed.

In this regard, the host 500 may check whether an image of the $i+1^{th}$ frame, which is the next refresh frame, is the same as an image of the $i^{th}$ frame (i.e., whether or not it is updated), and if it is the same, the host 500 may not output the $i^{th}$ frame image to the timing controlling portion 300. In this case, for example, a power of the host 500 may be turned off, data transmission from the host 500 to the timing controlling portion 300 may be in an off state.

At this time, the frame memory 310 stores the updated image data FDpi of the $i^{th}$ frame, that is, the image quality-processed frame image data FDpi.

As such, in the frame memory 310, the frame image data FDpi, which has already been image quality-processed, as the frame image data identical to the $i+1^{th}$ frame image is stored.

Thus, the image quality-processed image data FDpi of the $i^{th}$ frame may be used as it is for the refresh of the $i+1^{th}$ frame, so that re-processing the image quality may be omitted.

In this regard, for the $i+1^{th}$ frame, the data processing portion 320 may be in an off state, so that transmission between the data processing portion 320 and the frame memory 310 may be in an off state, and transmission between the data processing portion 320 and the data driving portion 230 may be in an off state. Instead, a bypass transmission path may be generated between the frame memory 310 and the data driving portion 230.

Accordingly, data may be transferred directly from the frame memory 310 to the latch 231 to be omitted without going through the data processing portion 320.

In this regard, for example, the frame memory 310 may directly transmit the image quality-processed image data LDp to the latch 231 in a unit of one horizontal line. In other words, the frame memory 310 may directly transmit the $1^{st}$ to $N^{th}$ horizontal line image data LDp1 to LDpN image quality-processed to the latch 231 in sequence.

Thereafter, similarly to the above description, the latch 231 may transmit the horizontal line image data LDp to the DAC 232, and the DAC 232 may convert the horizontal line image data LDp into the data voltages Vdata corresponding to gray levels of the respective image data DATA using gamma voltage.

Thereafter, the data voltage Vdata generated by the DAC 232 may pass through the buffer 233 and then be output to the corresponding data line DL.

The data voltage Vdata output to the data line DL may be input to the corresponding pixel P of the corresponding horizontal line, and the pixel P may be refreshed by the input data voltage Vdata.

As described above, in this aspect, the image quality-processed image data is updated in the frame memory 310, and when the image of the current refresh frame is identical to the image of the previous refresh frame without change, image quality processing is not performed for the image data of the current refresh frame but the image quality-processed image data of the previous refresh frame may be used as it is.

As such, the image quality processing operation for the frame image data may be omitted, so that power consumption for the image quality processing operation may be reduced and low-power driving may be achieved.

Moreover, when the VRR driving is applied together with the above driving of skipping the image quality processing, power consumption may be further reduced and more efficient low-power driving may be realized.

Figure 10:
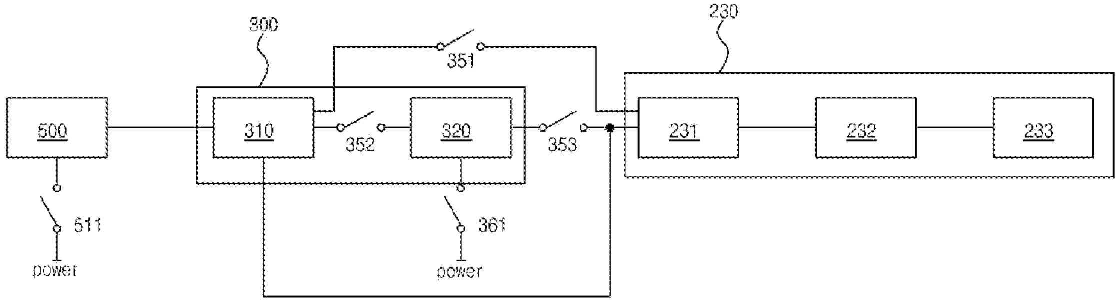
FIG. 10 is a view illustrating an example of a circuit structure of a driving circuit portion implementing low-power driving of a display apparatus according to an aspect of the present disclosure.

FIG. 10 is a view illustrating an example of a circuit structure of a driving circuit portion implementing low-power driving of a display apparatus according to an aspect of the present disclosure.

Referring to FIG. 10, a power switch (or first power switch) 511 for switching power on/off may be connected to the host 500.

Further, a transfer switch (or first transfer switch) 351 for switching on/off a transmission path between the frame memory 310 and the latch 231 may be connected between the frame memory 310 and the latch 231.

In addition, a power switch (or second power switch) 361 for switching the power on/off may be connected to the data processing portion 320.

Moreover, between the data processing portion 320 (or an input terminal of the data processing portion 320) and the frame memory 310, a transfer switch (or second transfer switch) 352 for switching on/off a transmission path between them may be connected. In addition, between the data processing portion 320 (or an output terminal of the data processing portion 320), and the latch 231 and the frame memory 310, a transfer switch 353 (or third transfer switch) for switching on/off a transmission path between them may be connected.

In this case, when there is a change in an image of the refresh frame and an image update is required, the first power switch 511 may be turned on, the second power switch 361 may be turned on, the first transfer switch 351 may be turned off, and the second and third transfer switches 352 and 353 may be turned on (or turned on alternately).

Accordingly, the host 500 may operate normally and transmit the frame image data to the frame memory 310, and the data processing portion 320 may operate normally and image quality-process the horizontal line image data input from the frame memory 310 and then transmit it to the latch 231 of the data driving portion 230. The data processing portion 320 may transmit the image quality-processed horizontal line image data to the frame memory 310, so that the frame memory 310 may be updated with the image quality-processed horizontal line image data.

Here, the second and third transfer switches 352 and 353 may be turned on alternately. For example, while the second transfer switch 352 is turned on and the horizontal line image data is transmitted to the data processing portion 320, the third transfer switch 353 may be turned off. Thereafter, while the third transfer switch 353 may be turned on and the data processing portion 320 may output the image quality-processed horizontal line image data, the second transfer switch 352 may be turned off.

On the other hand, when there is no change in the image of the refresh frame and no image update is required, the first power switch 511 may be turned off, the second power switch 361 may be turned off, the first transfer switch 351 may be turned on, and the second and third transfer switches 352 and 353 may be turned off.

Accordingly, new frame image data for refresh may not be input to the frame memory 310, and the image processing portion 320 may not operate. Instead, the frame memory 310 may directly transmit the image data of the previous frame, which have been image quality-processed and updated, to the latch 231 of the data driving portion 230 in a unit of one horizontal line.

Figure 11A:
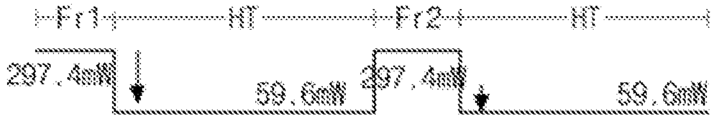
FIGS. 11A and 11B are views illustrating a simulation result of low-power driving of a display apparatus according to an aspect of the present disclosure.
Figure 11B:

FIGS. 11A and 11B are views illustrating a simulation result of low-power driving of a display apparatus according to an aspect of the present disclosure.

FIG. 11A shows power consumption when there is an image update in the low-speed driving mode of the VRR method, and FIG. 11B shows power consumption when there is no image update in the low-speed driving mode of the VRR method.

The simulation in FIG. 11 shows the result when the refresh rate is 15 Hz, the luminance is 300 nit, and the average peak luminance (APL) is 40%.

Referring to FIG. 11A as a case in which there is an image update, the power consumption in the first and second refresh frames Fr1 and Fr2 is approximately 297.4 mW, and the power consumption in the holding time HT consisting of three consecutive blank frames is approximately 59.6 mW.

Meanwhile, referring to FIG. 11B as a case in which there is no image update, the power consumption in the second refresh frame Fr2 without image update is approximately 179 mW, which is approximately 39. 8% lower than that when there is image update. It may be seen that the power consumption is significantly reduced.

As described above, according to the aspect of the present disclosure, the image quality-processed image data is updated in the frame memory, and when the image of the current refresh frame is the same as the image of the previous refresh frame without change, the image quality-processed image data of the previous refresh frame may be used as it is without performing the image quality processing on the image data of the current refresh frame.

As such, the image quality processing operation for the frame image data may be omitted, so that the power consumption for the image quality processing operation may be reduced and the low-power driving may be achieved.

Moreover, in the case where the driving of omitting the image quality processing is applied together with the VRR driving, the power consumption may be further reduced and more efficient low-power driving may be realized.

It will be apparent to those skilled in the art that various modifications and variation may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus, comprising:
- a display panel in which pixels are arranged along a plurality of horizontal lines;
- a data driving portion which converts image data of the pixels into data voltages and outputs the data voltages to the display panel;
- a frame memory which receives and stores the image data of a refresh frame from a host;
- a data processing portion which receives and image quality-processes the image data stored in the frame memory in a unit of one horizontal line, and transmits the image quality-processed image data to the data driving portion and the frame memory;
- a first power switch which switches power of the data processing portion;
- a first transfer switch which switches transmission path between the frame memory and the data driving portion;
- a second transfer switch which switches transmission path between the frame memory and an input terminal of the data processing portion; and
- a third transfer switch which switches transmission path between an output terminal of the data processing portion, and the data driving portion and frame memory,
- wherein the frame memory updates and stores the image data of the horizontal line image quality-processed into a corresponding horizontal line therein, and
- wherein image data of a $n^{th}$ refresh frame updated in the frame memory are transmitted to the data driving portion in a unit of one horizontal line when an image of a $n+1^{th}$ refresh frame is identical to an image of the $n^{th}$ refresh frame.

2. The display apparatus of claim 1, wherein when the image of the $n+1^{th}$ refresh frame is identical to the image of the $n^{th}$ refresh frame, data transmission from the host to the frame memory is in an off state for the $n+1^{th}$ refresh frame.

3. The display apparatus of claim 1, wherein when the image of the $n+1^{th}$ refresh frame is identical to the image of the $n^{th}$ refresh frame, the data processing portion is in an off state for the $n+1^{th}$ refresh frame.

4. The display apparatus of claim 1, wherein when the image of the $n+1^{th}$ refresh frame is identical to the image of the $n^{th}$ refresh frame, for the $n+1^{th}$ refresh frame, the first power switch is in an off state, the first transfer switch is in an on state, and the second and third transfer switches are in an off state.

5. The display apparatus of claim 1, wherein when the image of the $n+1^{th}$ refresh frame is different from the image of the $n^{th}$ refresh frame, for the $n+1^{th}$ refresh frame, the first power switch is in an on state, the first transfer switch is in an off state, and the second and third transfer switches are in an on state alternately.

6. The display apparatus of claim 1, further comprising a second power switch which switches power of the host,
- wherein when the image of the $n+1^{th}$ refresh frame is identical to the image of the $n^{th}$ refresh frame, the second power switch is in an off state for the $n+1^{th}$ refresh frame;
- wherein when the image of the $n+1^{th}$ refresh frame is different from the image of the $n^{th}$ refresh frame, the second power switch is in an on state for the $n+1^{th}$ refresh frame.

7. The display apparatus of claim 1, wherein the display apparatus is driven in a variable refresh rate method in which a cycle of the refresh frame is variable.

8. The display apparatus of claim 1, wherein the display panel is an organic light emitting display panel.

9. The display apparatus of claim 1, wherein the image data of the $n^{th}$ refresh frame updated in the frame memory are directly transmitted to the data driving portion in a unit of one horizontal line without passing through the data processing portion when the image of the $n+1^{th}$ refresh frame is identical to the image of the $n^{th}$ refresh frame.

10. A display apparatus, comprising:
- a display panel in which pixels are arranged along a plurality of horizontal lines;
- a data driving portion which converts image data of the pixels into data voltages and outputs the data voltages to the display panel;
- a frame memory which receives and stores the image data of a refresh frame; and
- a data processing portion which image quality-processes the image data stored in the frame memory and transmits the image quality-processed image data to the data driving portion and the frame memory,
- wherein the frame memory updates and stores the image quality-processed image data,
- wherein when an image of a current refresh frame is identical to an image of a previous refresh frame, image data of the previous refresh frame updated in the frame memory is transmitted to the data driving portion, and
- wherein the display apparatus further comprises:
  - a first power switch which switches power of the data processing portion;
  - a first transfer switch which switches transmission path between the frame memory and the data driving portion;
  - a second transfer switch which switches transmission path between the frame memory and an input terminal of the data processing portion; and
  - a third transfer switch which switches transmission path between an output terminal of the data processing portion, and the data driving portion and frame memory.

11. The display apparatus of claim 10, wherein when the image of the current refresh frame is identical to the image of the previous refresh frame, transmission of the image data of the current refresh frame to the frame memory is in an off state.

12. The display apparatus of claim 10, wherein when the image of the current refresh frame is identical to the image of the previous refresh frame, the data processing portion is in an off state for the current refresh frame.

13. The display apparatus of claim 10, wherein when the image of the current refresh frame is identical to the image of the previous refresh frame, for the current refresh frame, the first power switch is in an off state, the first transfer switch is in an on state, and the second and third transfer switches are in an off state.

14. The display apparatus of claim 10, wherein when the image of the current refresh frame is different from the image of the previous refresh frame, for the current refresh frame, the first power switch is in an on state, the first transfer switch is in an off state, and the second and third transfer switches are in an on state alternately.

15. The display apparatus of claim 10, wherein the data processing portion receives and image quality-processes the image data stored in the frame memory in a unit of one horizontal line.

16. The display apparatus of claim 10, wherein the display apparatus is driven in a variable refresh rate method in which a cycle of the refresh frame is variable.

* * * * *